(12) United States Patent
Lim

(10) Patent No.: US 8,576,320 B2
(45) Date of Patent: Nov. 5, 2013

(54) DIGITAL PHOTOGRAPHING APPARATUS AND METHOD OF CONTROLLING THE SAME

(75) Inventor: Jae-heung Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 13/240,413

(22) Filed: Sep. 22, 2011

(65) Prior Publication Data

US 2012/0081592 A1 Apr. 5, 2012

(30) Foreign Application Priority Data

Oct. 4, 2010 (KR) .................. 10-2010-0096518

(51) Int. Cl.
*H04N 5/222* (2006.01)
*H04N 5/232* (2006.01)
*G03B 13/00* (2006.01)
*G03B 3/00* (2006.01)

(52) U.S. Cl.
USPC ............ 348/333.04; 348/333.02; 348/333.12; 348/349; 396/89; 396/104

(58) Field of Classification Search
USPC ...................... 348/333, 33.02, 33.04, 333.12; 396/264, 123, 89, 104
See application file for complete search history.

(56) References Cited

U.S. PATENT DOCUMENTS

| | | | | |
|---|---|---|---|---|
| 5,721,981 A | * | 2/1998 | Kosaka et al. | 396/130 |
| 8,194,140 B2 | * | 6/2012 | Suzuki | 348/208.16 |
| 2003/0012277 A1 | * | 1/2003 | Azuma et al. | 375/240.08 |
| 2004/0239799 A1 | * | 12/2004 | Suzuki et al. | 348/370 |
| 2009/0079844 A1 | * | 3/2009 | Suzuki | 348/222.1 |
| 2010/0238325 A1 | * | 9/2010 | Hoshino et al. | 348/239 |
| 2011/0221911 A1 | * | 9/2011 | Kang | 348/207.99 |
| 2011/0242363 A1 | * | 10/2011 | Nozaki et al. | 348/231.99 |
| 2012/0081592 A1 | * | 4/2012 | Lim | 348/333.04 |

FOREIGN PATENT DOCUMENTS

KR 1020060060129 A 6/2006

* cited by examiner

*Primary Examiner* — James Hannett
*Assistant Examiner* — Padma Haliyur
(74) *Attorney, Agent, or Firm* — Drinker Biddle & Reath LLP

(57) ABSTRACT

A digital photographing apparatus with a display unit on a front surface thereof and a method of controlling the same. The method includes setting a self photographing mode; generating countdown information for self photographing; determining a subject distance; and displaying the countdown information together with a captured image on the display unit when the subject distance is shorter than a reference distance. Thereby, a photographer may see a preview along with the countdown information so that a desired self-photographed image may be acquired.

16 Claims, 8 Drawing Sheets

DIGITAL PHOTOGRAPHING APPARATUS AND METHOD OF CONTROLLING THE SAME

CROSS-REFERENCE TO RELATED PATENT APPLICATION

This application claims the benefit of Korean Patent Application No. 10-2010-0096518, filed on Oct. 4, 2010, in the Korean Intellectual Property Office, the entirely of which is incorporated herein by reference.

BACKGROUND

1. Field of the Invention

Embodiments relate to a digital photographing apparatus and method of controlling the same.

2. Description of the Related Art

When a photographer takes a photograph of himself as a subject using a digital photographing apparatus that includes a front display unit, countdown information from a timer is displayed on the front display unit. The countdown information is displayed on the front display unit so as to inform the subject when the photograph will be taken. In particular, the countdown information is typically displayed using white-colored numbers on a black background so as to be visible at a long distance from the camera. After the photograph is taken, the subject may view it on a display unit on the rear surface of the camera. However, there is no way for a subject, such as a subject that is close to the camera during the countdown, to see a live preview image before the photograph is taken to indicate whether the image being acquired is acceptable.

SUMMARY

The herein described apparatus and methods provide a digital photographing apparatus (camera) that can be used for self photographing that allows, from in front of the camera, a countdown timer to be checked and can provide a live preview image before a photograph is taken, and a method of controlling the digital photographing apparatus.

According to an embodiment, there is provided a method of controlling a digital photographing apparatus with a display unit on a front surface thereof that is disposed near a lens for inputting an optical signal, the method including setting a timer photographing mode; generating countdown information for self photographing; determining a distance of the subject from the camera (subject distance); and displaying the countdown information and a live preview image on the display unit when the subject distance is shorter than a reference distance.

The countdown information may be displayed as a semi-transparent image.

The method may further include recognizing a subject area from the captured image, wherein the subject distance may be determined according to a size of the subject area.

The method may further include recognizing a plurality of subject areas from the captured image; and determining the largest subject area from among the plurality of subject areas, wherein the subject distance may be determined according to a size of the largest subject area.

The method may further include recognizing a face area in the captured image, wherein the subject distance may be determined according to a size of the face area.

The method may further include displaying on the display unit the countdown information for self photographing and a background image that forms a contrast greater than a reference contrast with respect to the countdown information, when the subject distance is longer than the reference distance.

The countdown information may be displayed as a white image.

The background image may be displayed as a black image.

When the subject distance is shorter than the reference distance, first countdown information for self photographing may be displayed on the display unit, and when the subject distance is longer than the reference distance, second countdown information having a size larger than the first countdown information may be displayed on the displaying unit.

According to an embodiment, there is provided a digital photographing apparatus including a self photographing mode setting unit for setting a self photographing mode; a countdown information generating unit for generating countdown information for self photographing; a distance determination unit for determining a distance to a subject; and a display unit disposed on a front surface of the digital photographing apparatus where a lens for inputting an optical signal is disposed for displaying the countdown information and a captured image when the subject distance is shorter than a reference distance.

The display unit may display the countdown information as a semi-transparent image.

The apparatus may further include a subject recognition unit for recognizing a subject area from the captured image, wherein the distance determination unit may determine the subject distance according to a size of the subject area.

The apparatus may further include a subject recognition unit for recognizing a plurality of subject areas from the captured image; and a subject area determination unit for determining the largest subject area from among the plurality of subject areas, wherein the distance determination unit may determine the subject distance according to a size of the largest subject area.

The apparatus may further include a face recognition unit for recognizing a face area in the captured image, wherein the distance determination unit may determine subject distance according to a size of the face area.

The display unit may display the countdown information for self photographing and a background image that forms a contrast above a reference contrast with respect to the countdown information, when the subject distance is longer than the reference distance.

The countdown information may be displayed as a white image.

The background image may be displayed as a black image.

When the subject distance is shorter than the reference distance, the display unit may display first countdown information for self photographing, and when the subject distance is longer than the reference distance, the display unit may display second countdown information having a size larger than the first countdown information.

BRIEF DESCRIPTION OF THE DRAWINGS

The above and other features and advantages of the herein disclosed apparatus and methods will become more apparent in view of exemplary embodiments described with reference to the attached drawings in which.

DETAILED DESCRIPTION

Figure 1:
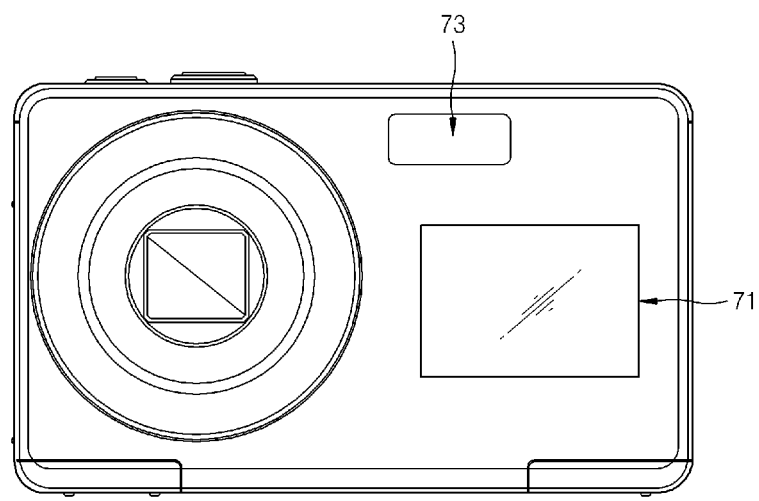
FIG. 1 illustrates a front surface of a digital photographing apparatus according to an embodiment.
Figure 2:
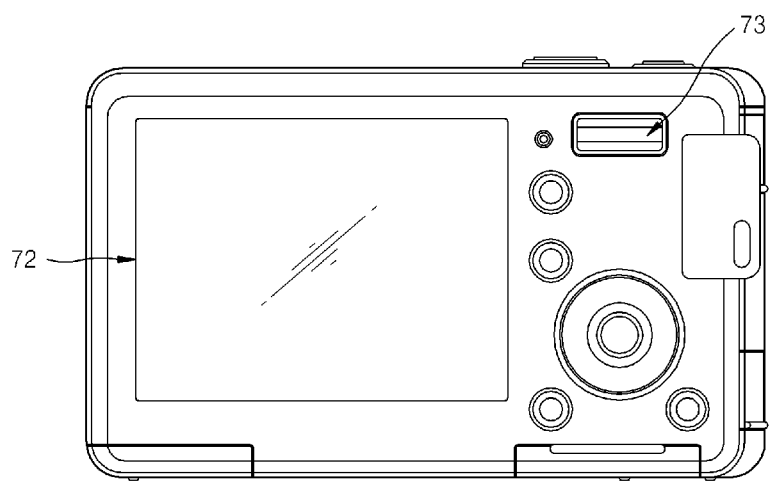
FIG. 2 illustrates a rear surface of the digital photographing apparatus of FIG. 1.

FIG. 1 illustrates a front surface of a digital photographing apparatus according to an exemplary embodiment, and FIG. 2 illustrates a rear surface of the digital photographing apparatus of FIG. 1.

FIGS. 1 and 2 illustrate a rear display unit 72 and a front display unit 71 disposed on rear and front surfaces, respectively, according to embodiments.

Referring to FIGS. 1 and 2, the front display unit 71 is disposed on the front surface of the digital photographing apparatus, which is also where a lens is disposed, so that a subject to be photographed may see the front display unit 71. The rear display unit 72 may be disposed on the rear surface of the digital photographing apparatus so that a photographer may see the rear display unit 72.

Figure 3:
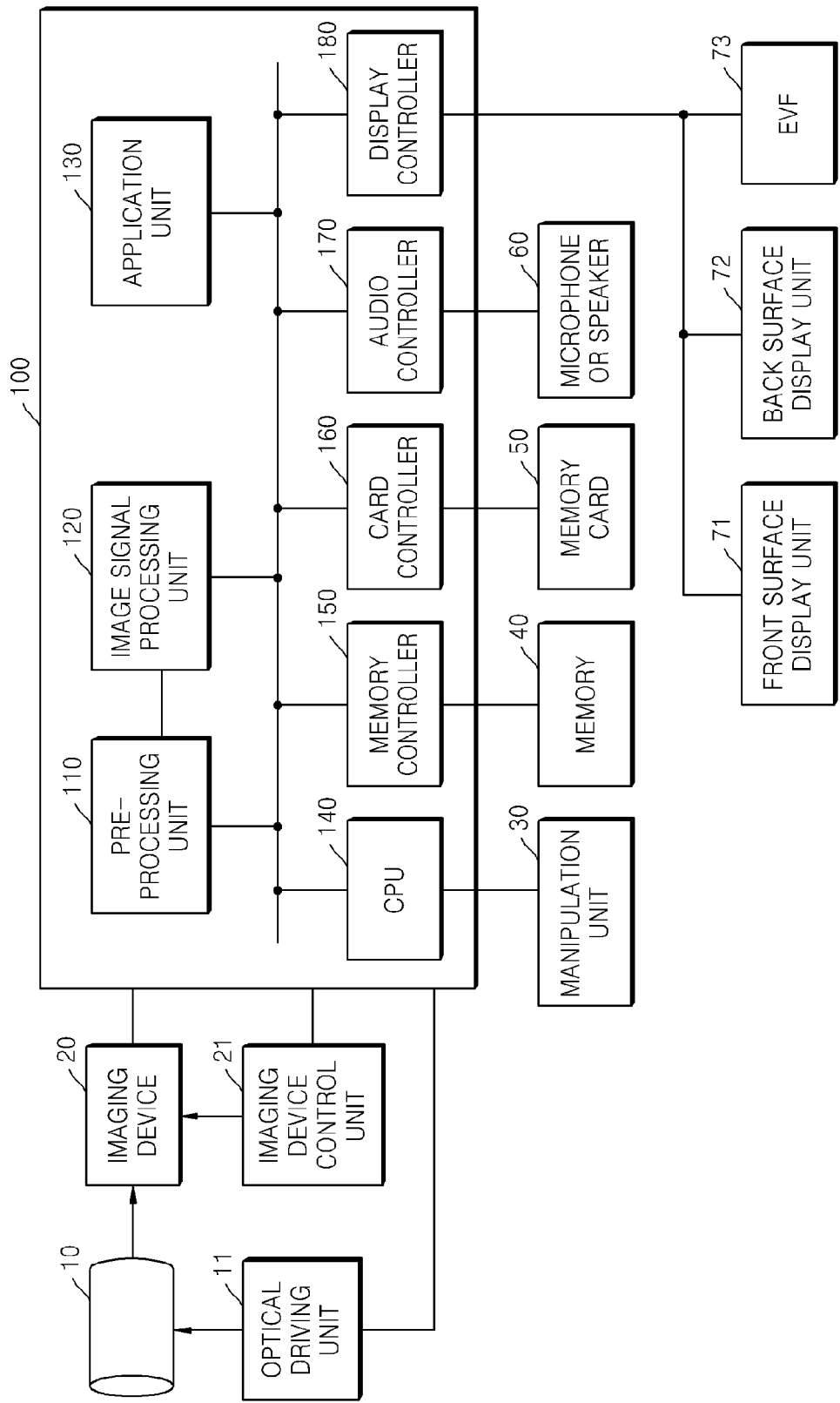
FIG. 3 is a block diagram of the digital photographing apparatus of FIG. 1.

FIG. 3 is a block diagram of the digital photographing apparatus of FIG. 1.

Referring to FIG. 3, the digital photographing apparatus includes an optical unit 10, an optical driving unit 11 for driving the optical unit 10, an imaging device 20, and an imaging device control unit 21.

The optical unit 10 includes an image forming lens system for collecting an optical signal from a subject, a shutter, and an iris. The image forming lens system includes a focus lens for controlling focus and a zoom lens for controlling a focal length.

The optical driving unit 11 may include a focus lens driving unit for controlling a position of the focus lens, an iris driving unit for controlling a diaphragm amount of the iris, and a shutter driving unit for controlling opening of the shutter.

The imaging device 20 captures image light passing through the image forming lens system which may be formed in an exchange lens and generates an image signal. The imaging device 20 may include a plurality of photoelectric conversion units arranged in a matrix form and a vertical and/or horizontal transfer path for obtaining an image signal by moving electrons from the photoelectric conversion units. The imaging device 20 may be a charge coupled device (CCD) sensor, a complementary metal oxide semiconductor (CMOS) sensor, or the like.

The imaging device control unit 21 controls the imaging device 20 to perform a photographing operation by synchronizing with a timing signal.

Also, the digital photographing apparatus includes a control unit 100. The control unit 100 includes a pre-processing unit 110, an image signal processing unit 120, an application unit 130, a central processing unit (CPU) 140, a memory controller 150, a card controller 160, an audio controller 170, and a display controller 180.

The pre-processing unit 110 outputs an auto white balance (AWB) appraisal value for controlling white balance, an auto exposure (AE) appraisal value for controlling exposure, and an auto focusing (AF) appraisal value for controlling a focus according to the image signal acquired from the imaging device 20.

The image signal processing unit 120 performs a series of image signal processes such as gamma correction and thus generates a preview image or a captured image.

The application unit 130 performs scene recognition using the image signal. Also, the application unit 130 may perform face detection using the image signal. In addition, the application unit 130 may compress or extend the image signal to which the image signal processes are performed. For example, the image signal may be compressed in a compression format such as a JPEG compression format or a H.264 compression format. An image file including image data generated by the compression may be stored in a memory card 50.

The CPU 140 controls the operations of the elements according to user manipulation, stored programs, and/or input image signals. The CPU 140 will be described more fully with reference to FIG. 4.

The memory controller 150 may temporarily store captured images and various information in a memory 40, and may output the stored captured images and various information from the memory 40. Also, the memory controller 150 may read program information stored in the memory 40.

The card controller 160 may store or read an image file to or from the memory card 50. Also, in addition to image files, the card controller 160 may control reading and storing of various information to or from the memory card 50.

The audio controller 170 controls a microphone or speaker 60.

The display controller 180 may control displaying of an image on the rear display unit 72 on the rear surface and the front display unit 71 on the front surface of the digital photographing apparatus. Also, the display controller 180 may control displaying of an image on an electronic view finder (EVF) 73. In the exemplary embodiment, the display controller 180 controls the front display unit 71, the rear display unit 72, and the EVF 73; however, the present invention is not limited thereto. Separate display controllers may be included in each of the front display unit 71, the rear display unit 72, and the EVF 73. The front display unit 71, the rear display unit 72, and/or the EVF 73 may each be any of various display devices such as a liquid crystal display (LCD) or an organic light emitting diode (OLED), for example.

Also, the digital photographing apparatus includes a manipulation unit 30 for inputting a manipulation signal of a user. The manipulation unit 30 may include various buttons such as a shutter release button, a main switch, a mode dial, and/or a menu button. In the illustrative embodiment, the manipulation unit 30 may include one or more buttons, dials, or the like; however, the present invention is not limited thereto. The manipulation unit 30 may include a touch panel installed inside or outside of a display unit.

Figure 4:
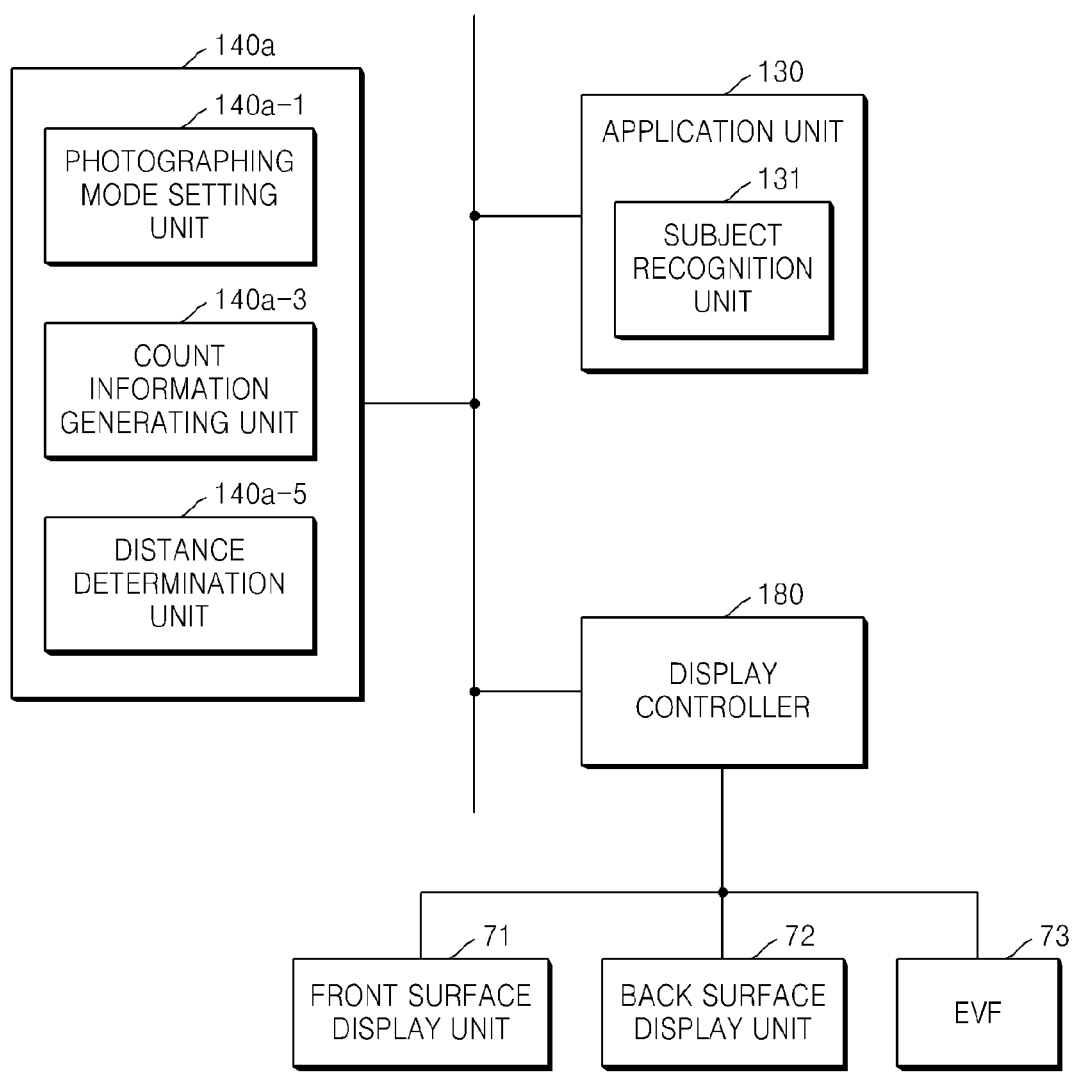
FIG. 4 is a block diagram of a central processing unit (CPU) of the digital photographing apparatus of FIG. 1, according to an embodiment.

FIG. 4 is a block diagram of an exemplary CPU 140a of the digital photographing apparatus of FIG. 1, according to an embodiment.

Referring to FIG. 4, the CPU 140a includes a photographing mode setting unit 140a-1 for setting a self photographing mode. The self photographing mode may include a plurality of modes corresponding to a timer. For example, the self photographing mode may include a first self photographing mode for photographing after 3 seconds, a second self photographing mode for photographing after 5 seconds, and a third self photographing mode for photographing after 10 seconds.

Also, the CPU 140a includes a countdown information generating unit 140a-3 for generating countdown information for self photographing. The countdown information may be generated according to time information corresponding to each of the plurality of self photographing modes. For example, when the first self photographing mode is set, countdown information of 3 seconds may be generated.

In addition, the CPU 140a may include a distance determination unit 140a-5 for determining a distance between the digital photographing apparatus and a subject (subject distance). The distance may be determined by measuring a size of a subject area of an input image of the subject. For example, when the subject size increases compared to the entire image, it may be determined that the subject distance is reduced. Alternatively or in addition, the subject area may be obtained using a subject recognition unit 131. For example, subject recognition unit 131 may comprise a face detection unit (FD) that detects a face area using a face detection algorithm. The distance may be then determined according to the obtained face area.

Alternatively, the distance may be obtained in correspondence to driving step numbers of the focus lens while focusing the subject, or may be obtained by other electronic, electroacoustic, or photometric means known in the art, such as measuring the subject distance by using an ultraviolet ray. The distance determination unit 140a-5 may compare the subject distance with a reference distance.

When it is determined by the distance determination unit 140a-5 that the subject distance is shorter than the reference distance, the front display unit 71 may display both the countdown information and a preview image. The countdown information may be displayed semi-transparently, outlined in colors complementary to the preview image colors, or having a small size overlaid on a portion of the preview image, for example. The preview image may be a live view image displayed in real time. For example, when a subject holds the digital photographing apparatus and directly photographs himself in a self photographing mode, the subject may acquire a desired image while checking a live preview image displayed on the front display unit 71 along with the countdown information.

When it is determined in the distance determination unit 140a-5 that the subject distance is longer than the reference distance, the countdown information and a background image may be displayed on the front display unit 71 without the preview image. The background image may have great contrast with the countdown information. For example, when the countdown information is white, the background image may be black. Also, the size of the countdown information that is displayed when the subject distance is longer than the reference distance may be larger than the size of the countdown information displayed when the subject distance is shorter than the reference distance.

The rear display unit 72 and the EVF 73 may display a live view image in real time. Also, a photographer performing self photographing does not check the rear display unit 72 and the EVF 73 and thus, optionally, a black image may be displayed or power may not be supplied thereto.

Displaying of images on the front and rear display units 71 and 72 and the EVF 73 may be controlled by the display controller 180.

Figure 5:
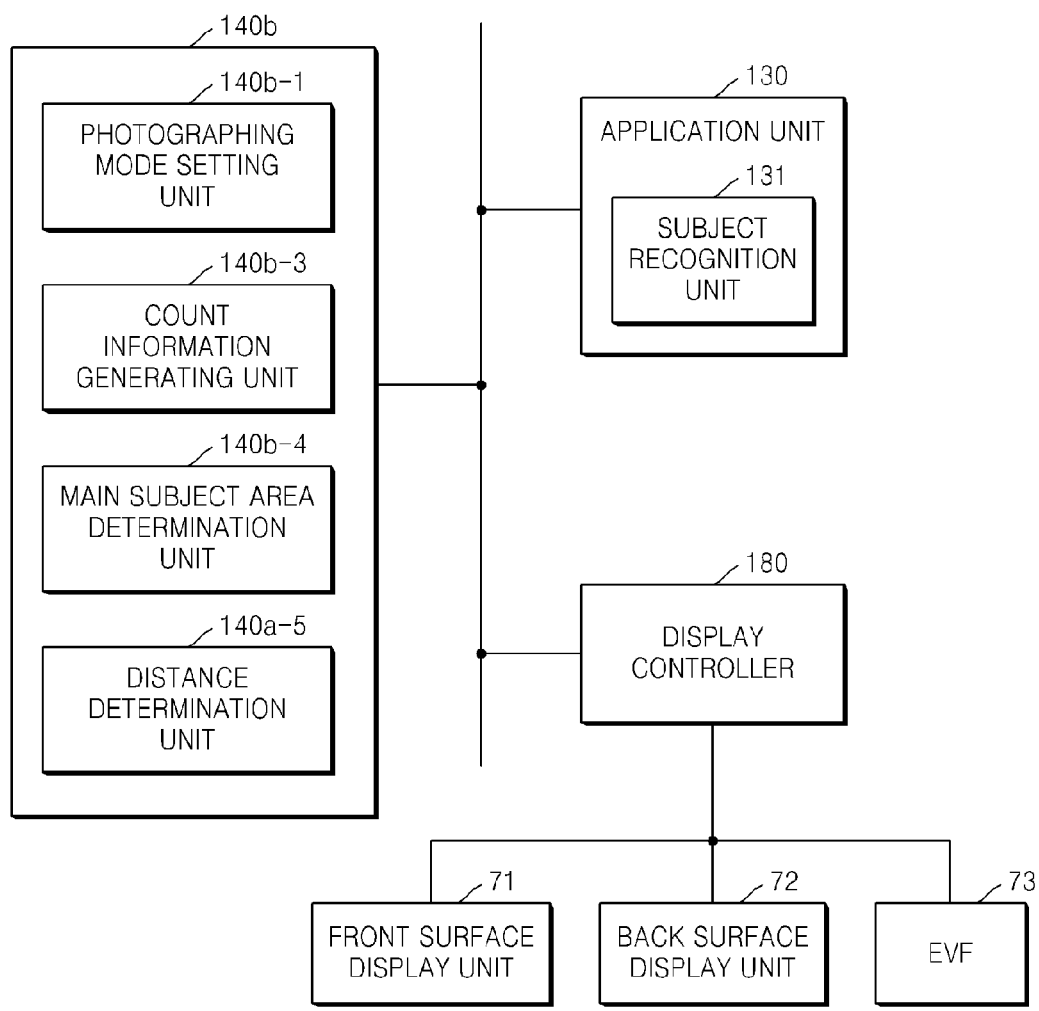
FIG. 5 is a block diagram of a CPU of the digital photographing apparatus of FIG. 1, according to another embodiment.

FIG. 5 is a block diagram of another exemplary CPU 140b of the digital photographing apparatus of FIG. 1, according to another embodiment. Because the CPUs of FIGS. 4 and 5 are similar, only the differences between them will be described.

Referring to FIG. 5, when a plurality of face areas are detected in an input image by the subject recognition unit 131, for example, by the FD unit thereof, a main subject area determination unit 140b-4 of the CPU 140b may determine a main subject area from among the plurality of face areas. For example, the largest face area may be determined to be the main subject area. Also, the main subject area may be specified by a user with manipulation unit 30.

A distance determination unit 140a-5 may determine a subject distance based on a size of the determined main subject area, and may compare the subject distance with a reference distance.

When the subject distance is shorter than the reference distance, a live preview image captured in real time and countdown information may be displayed together on the front display unit 71. The countdown information may be displayed semi-transparently or may be displayed having a size corresponding to a reference size or below so as to facilitate viewing of both the countdown information and the live preview image.

Figure 6:
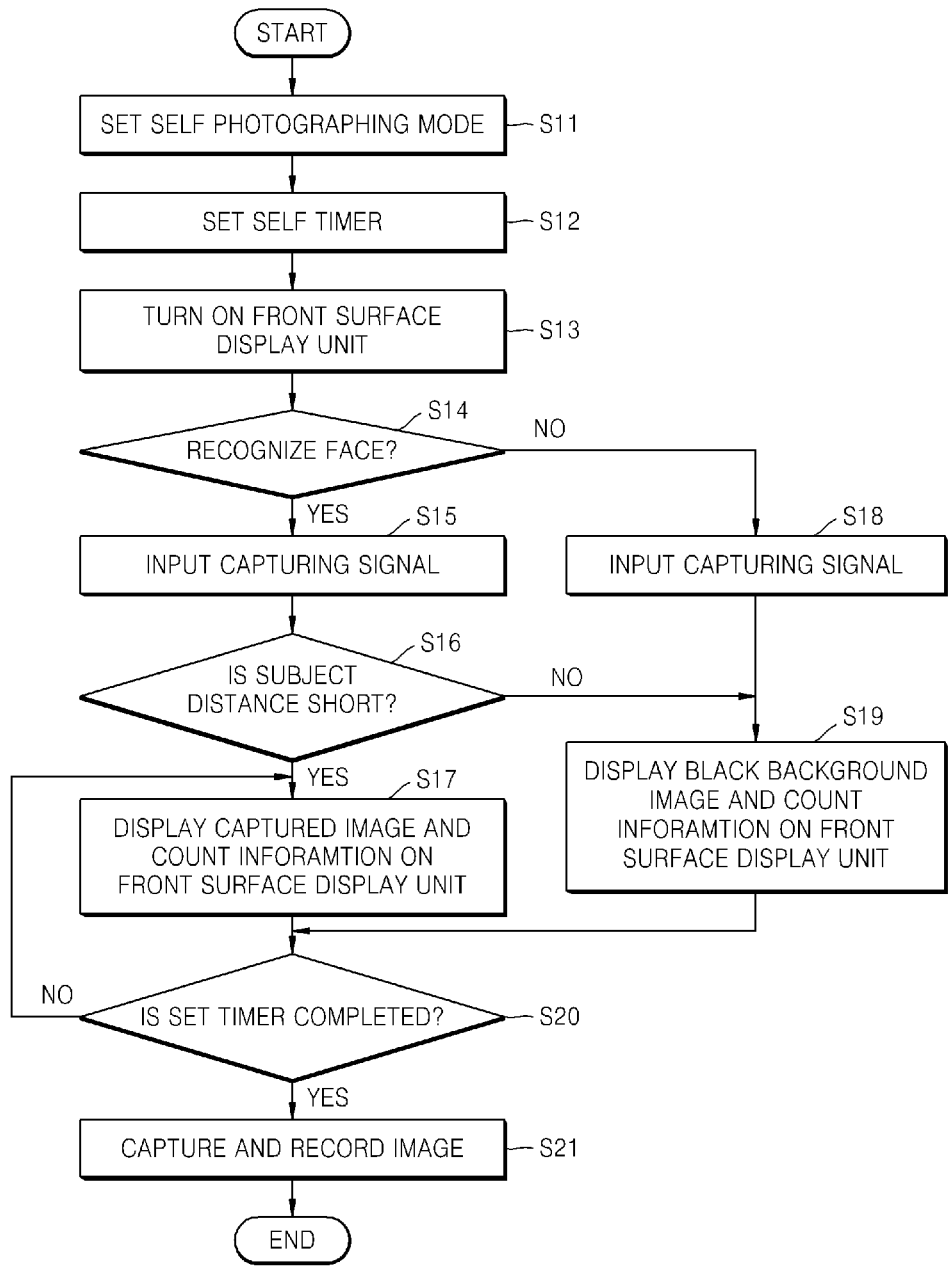
FIG. 6 is a flowchart illustrating a method of controlling a digital photographing apparatus, according to an embodiment.

FIG. 6 is a flowchart illustrating a method of controlling an exemplary digital photographing apparatus, according to an embodiment.

Referring to FIG. 6, a self photographing mode is set, step S11. A timer is set, S12. When the self photographing mode is classified according to the timer, the self photographing mode may be set concurrently with the timer.

A front display unit is turned on, S13. In an embodiment, the front display unit may be turned on before the self photographing mode or the timer is set.

Face recognition is performed on an input image and it is determined whether a face area is detected, S14. In the described embodiment, face area detection is illustrated; however, whether a subject is recognized may be determined through various methods.

When a face area is detected, a capturing signal is input, S15. After the capturing signal is input, the face area may be determined. The capturing signal may be used to generate a captured image (photograph), which is stored. Since the self photographing mode is set in the described embodiment, the photograph is not immediately captured. Instead, a countdown is initiated and the photograph is captured when the countdown is completed. Thus, when the capturing signal is input, S15, the countdown is initiated.

It is determined whether the subject distance is shorter than a reference distance, S16. As a size of the detected face area or a subject area increases, it may be determined that the subject distance is reduced. When the subject distance is shorter than a reference distance, a preview image and countdown information may be displayed on the front display unit, S17. The countdown information may be displayed semi-transparently or may have a size smaller than a reference size, for example. Accordingly, a user as both a photographer and a subject may easily view a live preview image along with the countdown information.

When the subject distance is longer than the reference distance, S16, the background image and the countdown information may be displayed on the front display unit.

If a face area is not detected in operation S14, the capturing signal may be input, S18. In that case, a background image and the countdown information may be displayed on the front display unit, S19. The background image may be black and the countdown information may be white, for example, but the present invention is not limited thereto. Preferably, the background image has great contrast with the countdown information, and the countdown information may also be displayed in a large format. Accordingly, a subject at a distance greater than the reference distance may view the countdown information.

It is then determined whether the countdown is completed, S20. When the countdown is complete, an image is captured and stored in an image file, S21. The image file (photograph) may be compressed before storage.

Figure 7:
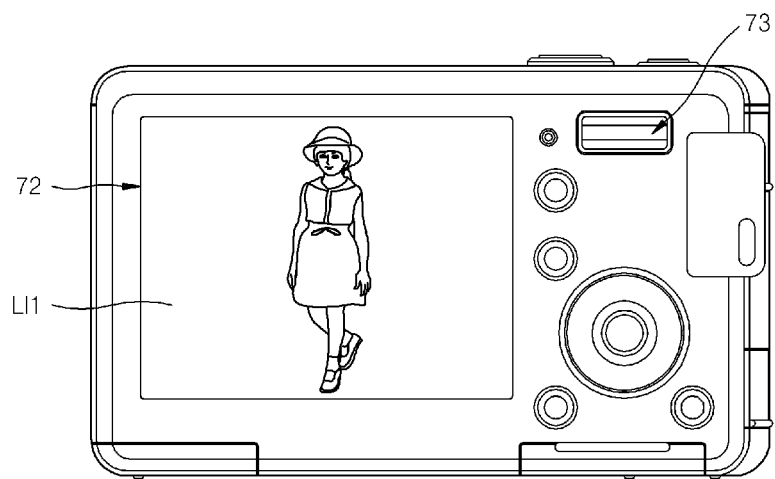
FIG. 7 illustrates displaying a captured image on a rear display unit of the digital photographing apparatus of FIG. 1, according to an embodiment.
Figure 8:
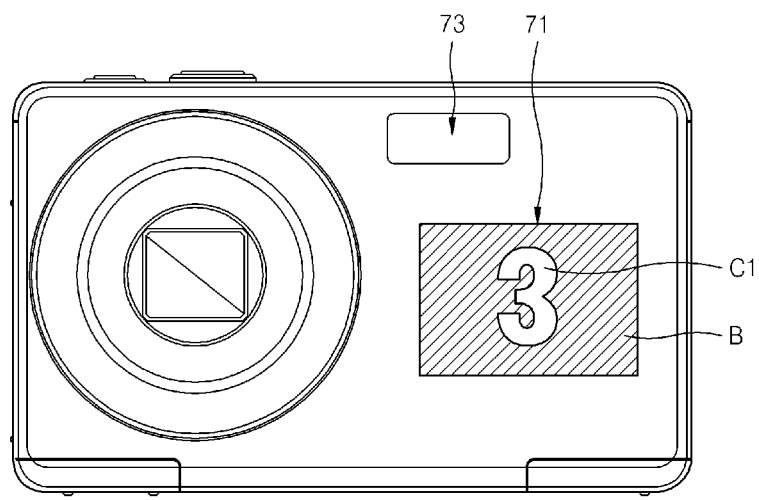
FIG. 8 illustrates displaying countdown information on a front display unit of the digital photographing apparatus of FIG. 1, according to an embodiment.

FIG. 7 illustrates displaying a captured image on the rear display unit 72 of the digital photographing apparatus of FIG. 1, according to an embodiment. IN FIG. 7, the entire subject is viewable, illustratively indicating that the subject distance is greater than the reference distance. FIG. 8 illustrates the front of the digital photographing apparatus when the subject distance is greater than the reference distance, as in FIG. 7. As shown, countdown information is displayed on the front display unit 71, while a preview image is being displayed on the rear display unit 72 of the digital photographing apparatus of FIG. 1, according to an embodiment.

In particular, when a subject distance is greater than a reference distance in a self photographing mode, a first live preview image LI1 may be displayed on the rear display unit 72, illustrated in FIG. 7. Simultaneously, countdown information may be displayed as a white-colored number image C1 and a black-colored background image B on the front display unit 71, illustrated in FIG. 8. In addition, since a photographer using the self photographing mode is the subject and is located in front of the camera, there is no need for the first live view image LI1 on the rear display unit 72 to be presented. Accordingly, the rear display unit 72 may be dimmed, display back, or be turned off.

Figure 9:
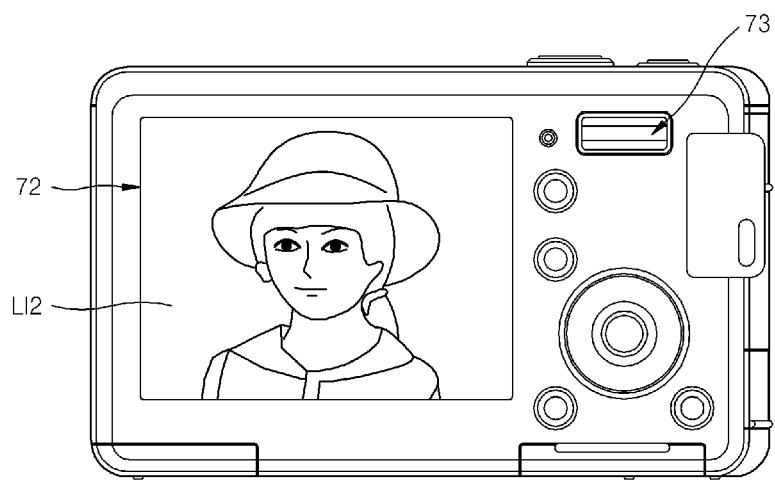
FIG. 9 illustrates displaying a captured image on the rear display unit of the digital photographing apparatus of FIG. 1, according to another embodiment.
Figure 10:
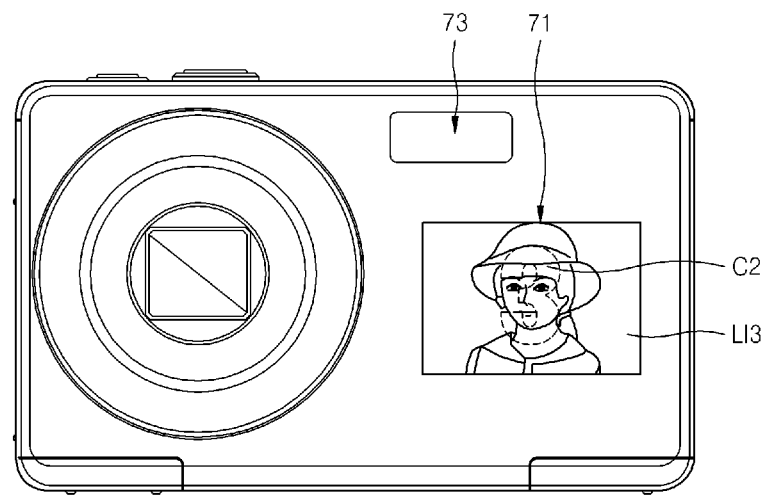
FIGS. 10 and 11 illustrate displaying countdown information on the front display unit while a captured image is also being displayed on the front display unit of the digital photographing apparatus of FIG. 1, according to embodiments.
Figure 11:
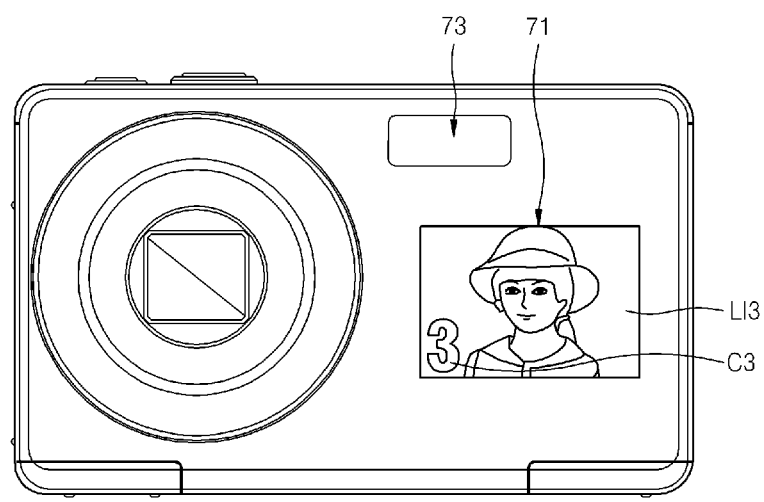

FIG. 9 illustrates displaying a captured image on the rear display unit 72 of the digital photographing apparatus of FIG. 1, wherein the large size of the subject indicates that the subject distance is less than the reference distance. FIGS. 10 and 11 illustrate displaying countdown information on the front display unit 71 while the preview image is being displayed on the rear display unit 72 of the described embodiment.

In particular, when the subject distance is shorter than the reference distance in a self photographing mode, a live preview image LI2 may be displayed on the rear display unit 72, as in FIG. 9. As previously described, however, there is no need to check the rear display unit 72, and the rear display unit 72 may be dimmed, turned off, or otherwise not be displayed.

Referring to FIG. 10, a preview image LI3 of the subject and countdown information C2 may be displayed together on the front display unit 71. Countdown information C2 may be a semi-transparent number image or the like, as previously described. Alternatively, the preview image LI3 and countdown information C3 may be displayed together on the front display unit 71, as in FIG. 11. Countdown information C3 may be displayed in a smaller format than the first countdown information C1 and/or may be displayed at an edge or corner of the front display unit 71. Countdown information C3 may alternatively be displayed on an area other than a subject area. Since the subject area is determined through subject recognition, countdown information C3 may be displayed on an area determined to be other than the subject area. For example, countdown information C3 may be displayed on an area other than a detected face.

A subject may view both the live preview image and the countdown information so that a desired self-photographed image may be acquired.

The methods of controlling the digital photographing apparatus described herein can be embodied as computer readable codes on a tangible computer readable storage medium. The computer readable storage medium may be any data storage device that can store data which can be thereafter read by a computer system. Examples of computer readable storage media include flash memory, magnetic storage, and optical storage, however, the invention is not so limited.

The digital photographing apparatus described herein may include one or more processors, memory for storing and executing program data, communication ports for handling communications with external devices, and user interface devices, such as a touch panel, keys, buttons, etc.

All references, if any, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to certain embodiments illustrated in the drawings, and specific language has been used to describe these embodiments. However, no limitation of the scope of the invention is intended by these embodiments or this specific language, and the invention should be construed to encompass all embodiments that would normally occur to one of ordinary skill in the art in view of this disclosure. The terminology used herein is for the purpose of describing the particular embodiments and is not intended to be limiting of exemplary embodiments of the invention.

The apparatus described herein may comprise a processor, a memory for storing program data to be executed by the processor, a permanent storage such as a disk drive, a communications port for handling communications with external devices, and user interface devices, including a display, keys, etc. When software modules are involved, these software modules may be stored as program instructions or computer readable code executable by the processor on a non-transitory computer-readable medium such as a semiconductor memory, random-access memory (RAM), read-only memory (ROM), CD-ROMs, DVDs, magnetic tapes, hard disks, floppy disks, and optical data storage devices. The computer readable media may also be distributed over network coupled computer systems so that the computer readable code is stored and executed in a distributed fashion. This media can be read by the computer, stored in the memory, and executed by the processor.

Also, using the disclosure herein, programmers of ordinary skill in the art to which the invention pertains may implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, Java, assembler, or the like, with the various methods being implemented with any combination of data structures, objects, processes, routines or other programming elements. Functional aspects may be implemented using algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development, and other functional aspects of the herein described systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism" and "element" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all embodiments within the scope of the claims will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of any ranges of values herein are merely intended to serve as a shorthand method of referring individually to each separate value falling within the range, unless otherwise indicated herein, and each separate value is incorporated into the specification as if it were individually recited herein.

What is claimed is:

1. A method of controlling a digital photographing apparatus comprising a back display unit on a back surface thereof and a front display unit on a front surface thereof in proximity to a lens inputting an optical signal, the method comprising:
setting a self photographing mode;
generating countdown information for self photographing;
determining a subject distance, and comparing the subject distance to a reference distance;
when the subject distance is shorter than the reference distance, displaying on the front display unit the countdown information in a first format along with a captured image based on the optical signal, wherein the first format comprises a letter or a number having a first size; and
when the subject distance is longer than the reference distance, displaying on the front display unit the countdown information alone in a second format, wherein the second format comprises a letter or a number having a second size that is larger than the first size.

2. The method of claim 1, wherein the countdown information is displayed as a semi-transparent image when the subject distance is shorter than the reference distance.

3. The method of claim 1, further comprising recognizing a subject area from the captured image, wherein the subject distance is determined according to a size of the subject area.

4. The method of claim 1, further comprising recognizing a plurality of subject areas from the captured image; and determining the largest subject area from among the plurality of subject areas, wherein the subject distance is determined according to a size of the largest subject area.

5. The method of claim 1, further comprising recognizing a face area in the captured image, wherein the subject distance is determined according to a size of the face area.

6. The method of claim 1, wherein the countdown information is displayed with a background image that forms a contrast above a reference contrast with respect to the countdown information, when the subject distance is longer than the reference distance.

7. The method of claim 6, wherein the countdown information is displayed as a white image.

8. The method of claim 6, wherein the background image is displayed as a black image.

9. A digital photographing apparatus comprising:
a self photographing mode setting unit operable to set a self photographing mode;
a countdown information generating unit operable to generate countdown information for self photographing;
a distance determination unit operable to determine a distance to a subject;
a display unit disposed on a back surface of the digital photographing apparatus; and
a display unit disposed on a front surface of the digital photographing apparatus in proximity to a lens inputting an optical signal, operable to:
display the countdown information in a first format along with a captured image based on the optical signal when the subject distance is shorter than a reference distance, wherein the first format comprises a letter or a number having a first size; and
display the countdown information alone in a second format when the subject distance is longer than the reference distance, wherein the second format comprises a letter or a number having a second size that is larger than the first size.

10. The apparatus of claim 9, wherein the display unit displays the countdown information as a semi-transparent image when the subject distance is shorter than the reference distance.

11. The apparatus of claim 9, further comprising a subject recognition unit that recognizes a subject area from the captured image, wherein the distance determination unit determines the subject distance according to a size of the subject area.

12. The apparatus of claim 9, further comprising a subject recognition unit for recognizing a plurality of subject areas from the captured image; and a subject area determination unit for determining the largest subject area from among the plurality of subject areas, wherein the distance determination unit determines the subject distance according to a size of the largest subject area.

13. The apparatus of claim 9, further comprising a face recognition unit operable to recognize a face and determine a face area in the captured image, wherein the distance determination unit determines the subject distance according to a size of the face area.

14. The apparatus of claim 9, wherein the front display unit displays the countdown information and a background image that forms a contrast above a reference contrast with respect to the countdown information, when the subject distance is longer than the reference distance.

15. The apparatus of claim 14, wherein the countdown information is displayed as a white image.

16. The apparatus of claim 14, wherein the background image is displayed as a black image.

* * * * *